INVENTORS
KOZO YAMAMOTO,
TOSHIO KAWADA,
BY Stevens, Davis, Miller & Mosher
ATTORNEYS

INVENTORS
KOZO YAMAMOTO,
TOSHIO KAWADA,
BY
ATTORNEYS

INVENTORS
KOZO YAMAMOTO,
TOSHIO KAWADA,

BY Stevens, Davis, Miller & Mosher
ATTORNEYS

United States Patent Office 3,514,050

Patented May 26, 1970

3,514,050

FAST FORWARDING AND REWINDING MECHANISM IN TAPE RECORDER OF MAGAZINE TYPE

Kozo Yamamoto, Hirakata-shi, and Toshio Kawada, Neyagawa-shi, Japan, assignors to Matsushita Electric Industrial Co., Ltd., Osaka, Japan, a corporation of Japan Filed Feb. 26, 1968, Ser. No. 708,153
Int. Cl. G03b *1/04*
U.S. Cl. 242—198 12 Claims

ABSTRACT OF THE DISCLOSURE

A tape recorder of the magazine type having means which permit a slight movement of the magazine in a direction different from the inserting direction of the magazine into the tape recorder casing, so that the tape can freely be rewound or fast forwarded without interference by the recording and reproducing mechanism.

BACKGROUND OF THE INVENTION

This invention relates to tape recorders of the magazine type equipped with rewinding and fast forwarding means, and more particularly to tape recorders of the type described above in which a mere movement of the tape drive section relative to the tape recorder casing can easily establish the desired conditions for fast forwarding and rewinding of a tape in addition to the normal recording and reproducing conditions.

In heretofore known tape recorders of the magazine type, the principal elements of the tape recorder including the magnetic head, the pinch roller, etc. had to be moved relative to the tape drive means in order to establish the desired conditions for rewinding and fast forwarding of a tape. However, the prior art structure in which the principal elements of the tape recorder are arranged for movement relative to the tape drive means in this manner has been disadvantageous economically as well as practically in view of the extreme complexity of the mechanism involved, the complex and troublesome steps required for the manufacture and assembling, and the necessity for providing a large number of actuating levers and knobs.

SUMMARY OF THE INVENTION

It is therefore an object of the present invention to provide a novel tape recorder of the magazine type adapted to operate with a tape magazine of the kind in which a magnetic tape supplied from one reel is taken up on the other and which is inserted into the tape recorder casing in a direction substantially perpendicular with respect to the reel shafts and the capstan mounted in the tape recorder, which tape recorder is featured by the fact that the tape drive means including the reel shafts and the capstan are carried by a movable body which is adapted to make a translational movement in its longitudinal direction thereby to establish the desired conditions for rewinding and fast forwarding of the tape.

Another object of the present invention is to provide a tape recorder of the magazine type having a tape drive section which is vertically movably supported within the tape recorder casing by link means, an actuating lever secured to one end of the tape drive section, and a pin upstanding from the actuating lever and engageable with an arcuate or curved slot in the tape recorder casing when the tape drive section engaged by a tape magazine is caused to move upwardly, so that a sliding movement of the pin on the actuating lever along the curved slot can urge the tape drive section away from the main body section of the tape recorder carrying therein the pinch roller, magnetic head, etc. thereby establishing the desired conditions for the rewinding and fast forwarding of the tape.

A further object of the present invention is to provide a tape recorder of the magazine type having a tape drive section which is vertically movably disposed within the tape recorder casing and carries thereon tape drive means including a motor, a flywheel, a capstan, and reel shafts, a tape speed change lever operatively connected with the internal mechanism of the tape drive section, and an actuating lever having an end extension which is disposed in the vicinity of the tape speed change lever and engageable with the tape speed change lever when the tape drive section is moved upwardly to a position adjacent thereto.

Still another object of the present invention is to provide a tape recorder of the magazine type having a tape drive section which is vertically movably disposed within the tape recorder casing and carries thereon tape drive means including a motor, a flywheel, a capstan and reel shafts, a tape speed change lever operatively connected with the internal mechanism of the tape drive section, and an actuating lever having an end extension which is always engaged by the outer end of the tape speed change lever and has a curved shape conforming to the locus drawn by the outer end of the tape speed change lever during the vertical movement of the tape drive section.

The tape recorder according to the present invention has many economical and practical advantages in that it can be remarkably simply and accurately manipulated for operation, and its very simple structure leads to a reduction of the number of parts, thus facilitating the assembling work, and providing an inexpensive unit.

DESCRIPTION OF THE PREFERRED EMBODIMENTS

Figure 1:
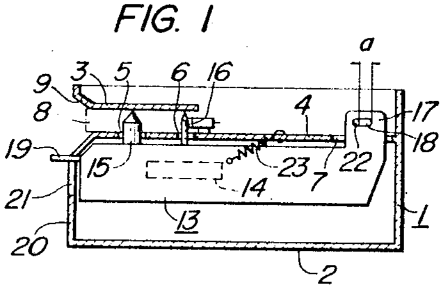
FIG. 1 is a vertical sectional view of a first embodiment of the tape recorder of the magazine type according to the present invention which is shown in the state after a tape magazine has been inserted therein.
Figure 4:
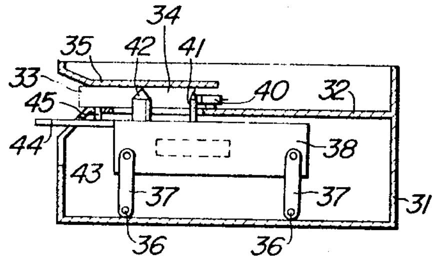
FIGS. 4 and 5 are vertical sectional views showing two different states of a second embodiment of the tape recorder of the magazine type according to the present invention.

A first embodiment of the present invention will be first described with reference to FIGS. 1 to 3. The tape recorder of the magazine type includes a stationary casing 1 which consists of a main body section 2 and an upper cover section 3 partly covering the main body section 2. The main body section 2 has an integral upper wall or support plate 4 which is provided with apertures 5 for allowing projection therethrough of reel shafts, an aperture 6 for allowing projection therethrough of a capstan, and an aperture 7 provided for a purpose described later. A guide plate 9 for guiding the insertion and withdrawal of a tape magazine 8 into and out of the tape recorder extends integrally from the upper cover section 3 inwardly into the casing 1 in parallel with the support plate 4 to define therebetween a magazine insertion opening. A pinch roller 10 is disposed on the support plate 4 in close proximity to the aperture 6, and magnetic heads 11 and 12 are disposed in side by side relation with the pinch roller 10.

A movable body 13 is movably supported within the stationary casing 1 and is internally provided with drive means including a flywheel 14 connected to a motor not shown. Reel shafts 15 and a capstan 16 operatively connected with the flywheel 14 extend upwardly through the upper surface of the movable body 13 in aligned relation with the respective apertures 5 and 6. A pair of mounting tongues 17 having aligned slots 18 are provided at one end of the movable body 13 and extend upwardly through the aperture 7 in the support plate 4 of the main body section 2. An actuating lever 19 is secured to the other end of the movable body 13 and projects outwardly from the casing 1 through a guide slot 21 bored in a side wall 20 of the casing 1. A pivot pin 22 extending transversely across the casing 1 is loosely received in the slots 18 at said one end of the movable body 13, and the axis of the pivot pin 22 is arranged to lie substantially in a plane passing the center of the width of a magnetic tape enclosed in the tape magazine 8, so that the movable body 13 can make a pivotal movement about the pivot pin 22 as well as a linear or translational movement along the slots 18. However, the pin 22 may be mounted on the movable body 13 and the slots 18 may be provided in the side walls of the casing 1. A spring 23 is anchored at one end to a portion of the movable body 13 and at the other end to a portion of the support plate 4 integral with the main body section 2 so as to normally urge the movable body 13 toward a position as shown in FIG. 1 in which the pivot pin 22 is situated at one or front corner of the slots 18 in the mounting tongues 17.

Figure 2:
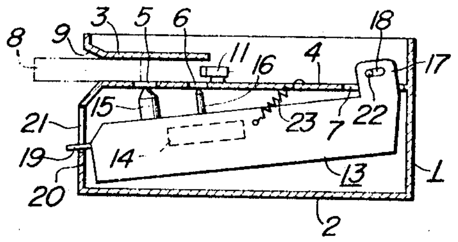
FIG. 2 is a vertical sectional view of the tape recorder of the magazine type which is shown in the state before the insertion of the tape magazine.
Figure 3:
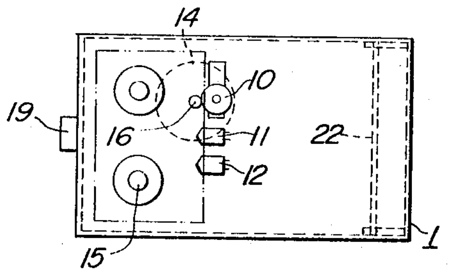
FIG. 3 is a schematic plan view of the tape recorder of the magazine type shown in FIG. 1.
Figure 6:
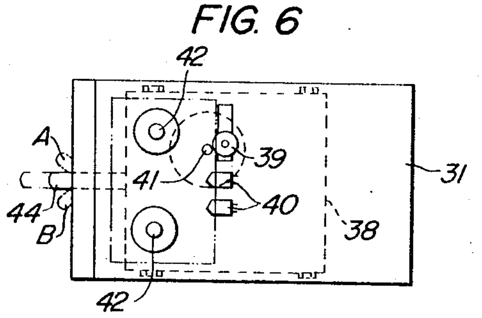
FIG. 6 is a schematic plan view of the tape recorder of the magazine type shown in FIG. 4.

Before the tape magazine 8 is inserted into the magazine insertion opening of the casing 1, the movable body 13 is urged to its lower position as shown in FIG. 2. In the state of the tape recorder shown in FIG. 2, the tape magazine 8 is inserted into the magazine insertion opening of the casing 1 along the support plate 4 and the guide plate 9. The actuating end of the lever 19 secured to the movable body 13 is then gripped by hand and is urged upwardly to cause the pivotal movement of the movable body 13 about the pivot pin 22. Due to the pivotal movement of the movable body 13, the reel shafts 15 and the capstan 16 carried by the movable body 13 project above the support plate 4 through the respective apertures 5 and 6 in the support plate 4 and fit in respective shaft receiving holes (not shown) provided in the tape magazine 8. Substantially simultaneously with the complete engagement of the reel shafts 15 and the capstan 16 with the respective holes in the tape magazine 8, the pinch roller 10 and the magnetic heads 11 and 12 are also brought to engage the capstan 16 and the magnetic tape in the tape magazine 8, respectively, and thus the tape recorder is set at its playable state. Upon completion of the play of recordings on the tape, the tape recorder can be reset at its non-playable state by urging the actuating lever 19 downwardly thereby to cause the pivotal movement of the movable body 13 from the position shown in FIG. 1 to the position shown in FIG. 2.

When it is desired to perform rewinding or fast forwarding of the tape in the playable state of the tape recorder shown in FIG. 1, the actuating lever 19 may be pulled in the left-hand direction against the force of the spring 23 to cause translational movement of the movable body 13 relative to the casing 1 in the left-hand direction by a distance *a* along the slots 18 engaged by the pivot pin 22, thereby moving the capstan 16 and the tape away from the pinch roller 10 and the magnetic heads 11 and 12, respectively, and placing the tape recorder in a state in which the tape can unobstructedly be rewound or fast forwarded.

Figure 7:
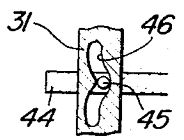
FIG. 7 is an enlarged plan view of part of the tape recorder of the magazine type shown in FIG. 4.

Referring next to FIGS. 4 to 7, a second embodiment of the present invention will be described. Briefly speaking, the tape recorder of the magazine type shown in FIGS. 4 to 7 includes a stationary casing 31 within which an insertion opening 34 for a tape magazine 33 is defined between a part of a support plate 32 which is an integral part of the casing 31 and a guide plate 35 which is also an integral part of the casing 31 and is disposed above the support plate 32 in parallel therewith. A movable body 38 carrying therein tape drive means including a motor, a flywheel, two reel tables, etc. is movably supported within a space defined between the support plate 32 and the bottom surface of the casing 31 by means of four links 37 which are each pivoted at one end to the bottom surface of the casing 31 by a pin 36 and at the other end to a lower part of the movable body 38. A pinch roller 39 and magnetic heads 40 are mounted on a part of the support plate 32, and an aperture 43 is bored through the support plate 32 at a position closely adjacent to the pinch roller 39 and the magnetic heads 40 so that a capstan 41 and reel shafts 42 carried by the movable body 38 can project upwardly through the aperture 43. An actuating lever 44 is fixed to one or front end of the movable body 38 and has its actuating end projecting outwardly from the casing 31 through a guide slot 47 bored in a side wall of the casing 31. An upstanding lug 45 is provided on a suitable portion of the actuating lever 44 so that, when the movable body 38 is urged upwardly by gripping the actuating end of the actuating lever 44 by hand and pushing it toward the casing 31, the lug 45 can engage a V-shaped slot 46 formed in a part of the casing 31 as shown in FIG. 7. However, the lug 45 may be provided on the casing 31 and the slot 46 may be formed in the lever 44.

Figure 5:
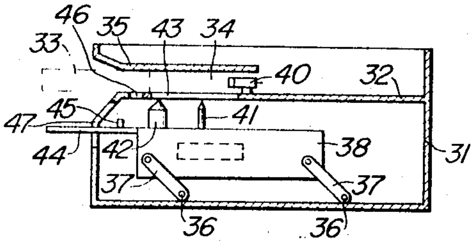

The second embodiment of the present invention is manipulated for operation in the manner described below. Prior to the insertion of the tape magazine 33 into the magazine insertion opening 34, the actuating lever 44 is forcedly pulled outwardly away from the casing 31 in order to urge the movable body 38 to its lower position lowered toward the bottom surface of the casing 31 as shown in FIG. 5. After the movable body 38 has been set at such a position, the tape magazine 33 is inserted into the magazine insertion opening 34 along the guide plate 35 until it rests at the most deeply inserted position. The actuating lever 44 is then pushed toward the casing 31 to cause the upward movement of the movable body 38, thereby bringing the reel shafts 42 into engagement with the reels in the tape magazine 33 and setting up the condition capable of tape drive.

The tape recorder placed in such a state can properly make the recording or reproduction. A need for rewinding or fast forwarding of the tape may arise after the complete recording or reproduction of recordings on the tape or during the recording or reproducing operation on the tape. The condition for rewinding or fast forwarding of the tape can easily be established in accordance with the present invention by merely urging the actuating lever 44 in a transverse direction of the tape recorder. The above movement of the actuating lever 44 results in a sliding movement of the lug 45 on the actuating lever 44 along the V-like slot 46 in the casing 31, thereby urging the tape drive means carried by the movable body 38 to move slightly away from the magnetic heads 40 and the pinch roller 39 to establish the desired condition for free rewinding or fast forwarding of the tape.

Figure 8:
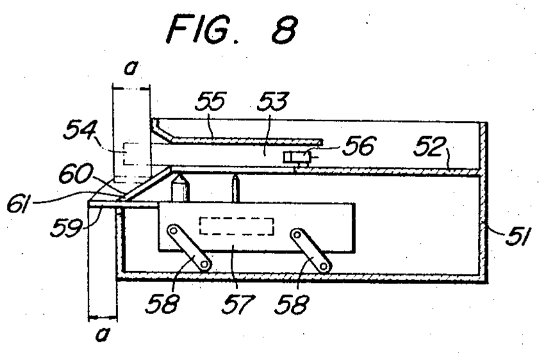
FIG. 8 is a vertical sectional view of a third embodiment of the tape recorder of the magazine type according to the present invention.

Referring to FIG. 8, a third embodiment of the tape recorder according to the present invention comprises a stationary casing 51, a support plate 52 formed within the casing 51 as an integral part of the latter, and a magazine insertion opening 53 defined between the support plate 52 and a guide plate 55, which is also an integral part of the casing 51, to allow the insertion of a tape magazine 54 therein. Principal elements of the tape recorder including magnetic heads 56 are mounted on a part of the support plate 52, while tape drive means including a motor, a flywheel, a capstan, reel tables, and reel shafts are carried by a movable body 57 which is movably supported within the casing 51 by means of four links 58 which are each pivoted at one end to the bottom surface of the casing 51 and at the other end to a lower part of the movable body 57. An actuating lever 59 is secured to one end of the movable body 57 and has its actuating end projecting outwardly from the casing 51 through a guide slot 61 bored in a side wall portion 60 of the casing 51. As will be seen in FIG. 8, the side wall portion 60 has a sloped surface contour which is so shaped as to conform to the locus drawn by the actuating end of the actuating lever 59 as the actuating lever 59 is pushed inwardly to cause the upward movement of the movable body 57 from the lower position shown in FIG. 8.

Figure 9:
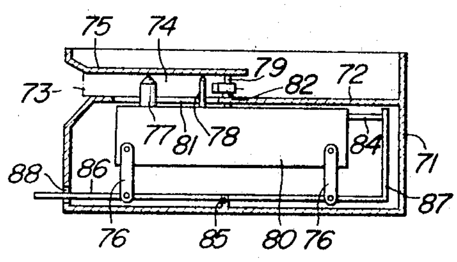
FIGS. 9 and 10 are vertical sectional views showing two different states of a fourth embodiment of the tape recorder of the magazine type according to the present invention.
Figure 10:
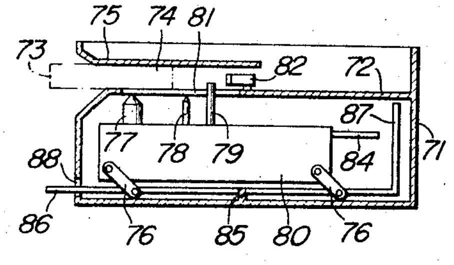
Figure 11:
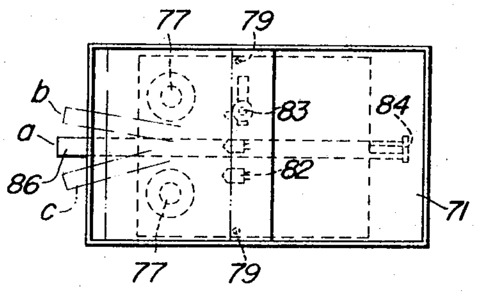
FIG. 11 is a schematic plan view of the tape recorder of the magazine type shown in FIG. 9.

A fourth embodiment of the present invention will next be described with reference to FIGS. 9 to 11. The tape recorder of the magazine type shown herein comprises a stationary casing 71, a support plate 72 formed within the casing 71 as an integral part of the latter, and a magazine insertion opening 74 defined between the support plate 72 and a guide plate 75, which is also on upper integral part of the casing 71, to allow the insertion of a tape magazine 73 therein. A movable body 80 carrying thereon tape drive means including a motor, a flywheel, reel shafts 77, a capstan 78 and abutment pins 79 is vertically movably supported within the casing 71 by means of four links 76 which are each pivoted at one end to the bottom surface of the casing 71 and at the other end to a lower part of the movable body 80.

An aperture 81 is provided in that portion of the support plate 72 which is opposed by the reel shafts 77, capstan 78 and abutment pins 79 carried by the movable body 80 so that, as the tape magazine 73 is inserted into the magazine insertion opening 74 and moves over the aperture 81, the abutment pins 79 normally projecting above the level of the aperture 81 are first engaged by the leading end of the tape magazine 73, and then the reel shafts 77 and the capstan 78 are caused to project through the aperture 81 to engage the corresponding receiving holes in the tape magazine 73. Principal elements of the tape recorder including magnetic heads 82 and a pinch roller 83 are disposed on the support plate 72 in close proximity to the aperture 81. A tape speed change lever 84 operatively connected at one end with the internal mechanism of the movable body 80 extends rearwardly from the rear end of the movable body 80, and an actuating lever 86 having a bifurcated upstanding finger 87 at the rear end thereof extends beneath the movable body 80 and is pivotally supported at its middle portion by a pivot pin 85. The relation between the tape speed change lever 84 and the actuating lever 86 is such that the bifurcated upstanding finger 87 of the latter engages the other or free end of the former only when the movable body 80 is moved upwardly to its upper position. The front end of the actuating lever 86 projects outwardly through a slot 88 bored in a side wall of the casing 71 so as to be actuatable from outside.

The fourth embodiment of the present invention is manipulated for operation in the manner described below. The movable body 80 is normally placed in its lower position lowered within the casing 71 as shown in FIG. 10. In such a state of the tape recorder, the tape magazine 73 is inserted into the magazine insertion opening 74 along the guide plate 75. As the tape magazine 73 is progressively inserted along the guide plate 75, the leading end of the tape magazine 73 is first engaged by the abutment pins 79 and urges the abutment pins 79 rearwardly thereby causing the upward movement of the movable body 80 vertically movably supported by the links 76. When the tape magazine 73 is completely bodily inserted in the magazine insertion opening 74 as shown in FIG. 9, the capstan 78 and the reel shafts 77 carried by the movable body 80 engage the corresponding holes in the tape magazine 73 thereby setting up the necessary condition for the drive of a tape in the tape magazine 73. Further, in the upper position of the movable body 80, the bifurcated upstanding finger 87 of the actuating lever 86 engages the free end of the tape speed change lever 84.

The tape recorder placed in the above state can properly make the recording or reproduction. A need for the rewinding or fast forwarding of the tape may arise after the complete recording or reproduction of recordings on the tape or during the recording or reproducing operation on the tape. The actuating end of the actuating lever 86 is set at a position *a* as shown in FIG. 11 in the case of the normal feed of the tape during the recording or reproduction. In case rewinding or fast forwarding of the tape is desired, the actuating end of the actuating lever 86 may merely be urged from the position *a* to a position *b* or *c*. More precisely, when the actuating end of the actuating lever 86 is urged toward the position *b* for the sake of tape rewinding, the actuating lever 86 is rotated clockwise about the pivot pin 85 to turn the tape speed change lever 84 in the same direction or clockwise, thereby shifting the internal mechanism of the movable body 80 to the rewinding position and setting up the necessary condition for tape rewinding.

On the other hand, when the actuating end of the actuating lever 86 is urged toward the position *c* for the sake of fast forwarding of the tape, the actuating lever 86 and the tape speed change lever 84 are turned counter-clockwise to shift the internal mechanism of the movable body 80 to the tape fast forwarding position thereby setting up the necessary condition for fast forwarding of the tape. It will be understood that the recording or reproducing condition can easily be restored by merely shifting the actuating end of the actuating lever 86 to the central position which is the position *a*.

Figure 12:
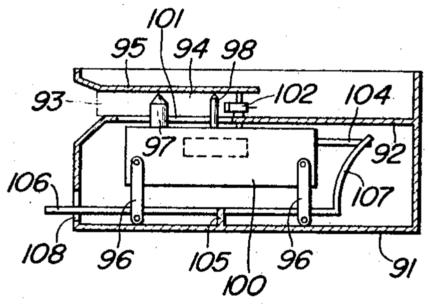
FIG. 12 is a vertical sectional view of a fifth embodiment of the tape recorder of the magazine type according to the present invention, the tape recorder being shown in the state after a tape magazine has been inserted therein.
Figure 14:
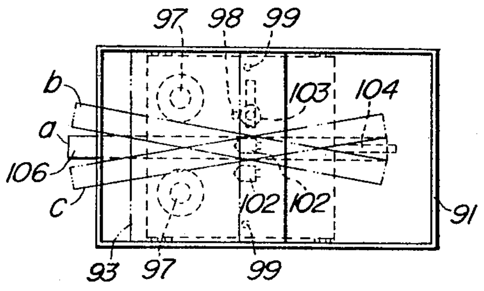
FIG. 14 is a schematic plan view of the tape recorder of the magazine type shown in FIG. 12, the view showing the state after the insertion of the tape magazine.
Figure 13:
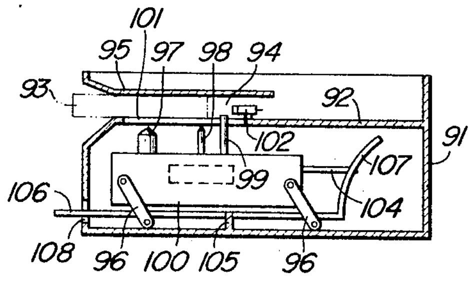
FIG. 13 is a vertical sectional view similar to FIG. 12, but showing the tape recorder in the state before the insertion of the tape magazine.

Referring to FIGS. 12 to 14, a fifth embodiment of the present invention will be described. The tape recorder of the magazine type shown herein comprises a stationary casing 91, a support plate 92 formed within the casing 91 as an integral part of the latter, and a magazine insertion opening 94 defined between the support plate 92 and a guide plate 95, which is also an upper integral part of the casing 91, to allow the insertion of a tape magazine 93 therein. A movable body 100 carrying thereon tape drive means including a motor, a flywheel, reel shafts 97, a capstan 98, and abutment pins 99 is vertically movably supported within the casing 91 by means of four links 96 which are each pivoted at one end to the bottom surface of the casing 91 and at the other end to a lower part of the movable body 100.

An aperture 101 is provided in that portion of the support plate 92 which is opposite to the reel shafts 97, capstan 98 and abutment pins 99 carried by the movable body 100 so that, as the tape magazine 93 is inserted into the magazine insertion opening 94 and moves over the apertuer 101, the abutment pins 99 normally projecting above the level of the aperture 101 are first engaged by the leading end of the tape magazine 93, and then the reel shafts 97 and the capstan 98 are caused to project through the aperture 101 to engage the corresponding receiving holes in the tape magazine 93. Principal elements of the tape recorder including magnetic heads 102 and a pinch roller 103 are disposed on the support plate 92 in close proximity to the aperture 101. A tape speed change lever 104 operatively connected at one end with the internal mechaism of the movable body 100 extends rearwardly from the rear end of the movable body 100, and the other or free end of the lever 104 is normally engaged by a bifurcated arcuate finger 107 upstanding from the rear end of an actuating lever 106 which extends beneath the movable body 100 and is pivotally supported at its middle portion by a pivot pin 105. The front end of the actuating lever 106 projects outwardly through a slot 108 bored in a side wall of the casing 91 so as to be actuatable from outside. The curvature of the arcuate finger 107 is such that it conforms to the locus drawn by the free end of the tape speed change lever 104 in the vertical movement of the movable body 100.

The fifth embodiment of the present invention is manipulated for operation in the manner described below. The movable body 100 is normally placed in its lower position lowered within the casing 91 as shown in FIG. 13. In such a state of the tape recorder, the tape magazine 93 is inserted into the magazine insertion opening 94 along the guide plate 95. As the tape magazine 93 is progressively inserted along the guide plate 95, the leading end of the tape magazine 93 is engaged by the abutment pins 99 and urges the abutment pins 99 rearwardly thereby causing the upward movement of the movable body 100 vertically movably supported by the links 96. When the tape magazine 93 is completely bodily inserted in the magazine insertion opening 94 as shown in FIG. 12, the capstan 98 and the reel shafts 97 carried by the movable body 100 engage the corresponding holes in the tape magazine 93 thereby setting up the necessary condition capable of recording or reproduction.

When the tape recorder placed in the above state, recordings can be provided on the tape or recordings on the tape can be reproduced by actuating the drive means carried by the movable body 100. In this case, the actuating end of the actuating lever 106 is set at a position *a* as shown in FIG. 14. During the recording or reproducing operation of the tape, a need for rewinding or fast forwarding of the tape may arise. In case the rewinding or fast forwarding of the tape is desired, the actuating end of the actuating lever 106 may merely be urged from the position *a* in FIG. 14 to a position *b* or *c*, thereby causing a corresponding movement of the tape speed change lever 104 to shift the internal mechanism of the movable body 100 for setting up the necessary condition for rewinding or fast forwarding of the tape.

Figure 15:
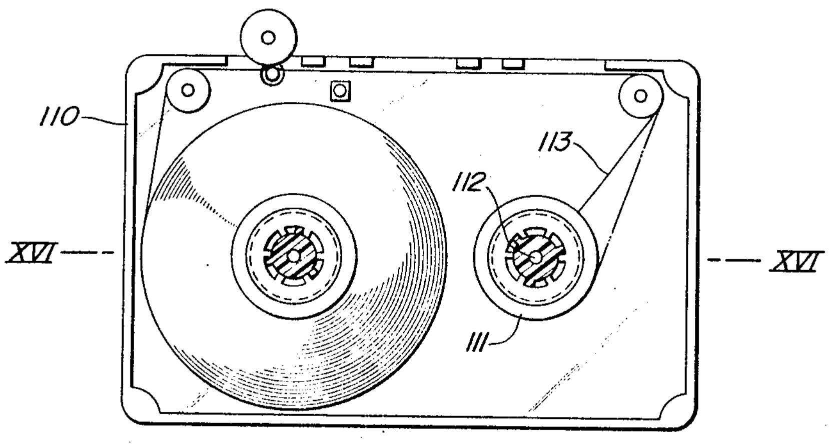
FIG. 15 is a cross-sectional view of a tape magazine used in combination with the tape recorder according to the present invention.
Figure 16:
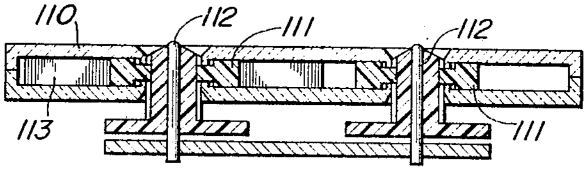
FIG. 16 is a sectional view taken along the line XVI—XVI in FIG. 15.

Referring to FIGS. 15 and 16, the shape and structure of the tape magazine preferably used with the tape recorder embodying the present invention will be briefly described. The tape magazine comprises a generally rectangular casing 110 housing therein a pair of spaced rotatable hubs 111 having therein holes engageable with reel shafts 112 carried by the movable body. In the casing 110, a magnetic tape 113 is trained around the rotatable hubs 111 with its opposite ends securely fixed to the outer periphery of the latter.

We claim:

1. A tape recorder of the magazine type adapted to operate with a magazine of the kind equipped with two rotatable hubs for the supply and take-up of a magnetic tape enclosed therein, having a movable body provided with means for driving said tape in said magazine and movable between two extreme positions in connection with insertion and withdrawal of said magazine into and out of a magazine insertion opening in said tape recorder, and a stationary casing movbly supporting said movable body therein, said movable body carrying thereon a drive motor, a capstan mounted in coaxial relation with a flywheel which is driven from said drive motor so as to drive said tape in said magazine, and reel shafts for causing rotation of said two hubs in said magazine, said casing carrying therein a magnetic head engageable with said tape in said magazine and a pinch roller for holding said tape between it and said capstan on said movable body so as to drive said tape in cooperation with said capstan; said tape recorder comprising means for pivotally and linearly movably supporting one end, which is remote from the side carrying said reel shafts, of said movable body in one end of said casing so that said movable body can make a linear movement at said one end in the moving direction of said magazine as well as a pivotal movement about said one end, and means for causing a slight movement of said magazine in a direction different from the inserting direction thereof thereby releasing said capstan from the driving engagement with said pinch roller whereby to effect unobstructed rewinding and fast forwarding of said tape.

2. A tape recorder of the magazine type according to claim 1, the last mentioned means comprising a pin provided adjacent to said one end which is remote from said reel shaft side of said movable body, and an elongated slot provided adjacent to said one end of said casing for guiding the movement of said pin.

3. A tape recorder of the magazine type according to claim 1, the last mentioned means comprising a pin provided adjacent to said one end of said casing, and an elongated slot provided adjacent to said one end which is remote from said reel shaft side of said movable body for guiding the movement of said pin.

4. A tape recorder of the magazine type according to claim 1, comprising spring means for normally urging said movable body away from said casing.

5. A tape recorder of the magazine type according to claim 1, comprising abutment means engageable with one end of said magazine and movable in the moving direction of said magazine as said magazine is gradually inserted, and means for normally urging said movable body toward the magazine insertion opening side of said casing and away from the major face of said magazine.

6. A tape recorder of the magazine type according to claim 1, comprising link means for vertically movably supporting said movable body within said casing, an actuating lever connected to said movable body, and means associated with said actuating lever so that said magazine engaging said movable body can be urged away from said magnetic head and said pinch roller disposed on said casing in response to a shifting movement of said actuating lever in a transverse direction thereby to allow for unobstructed rewinding and fast forwarding of said tape.

7. A tape recorder of the magazine type according to claim 6, in which said means comprises a pin provided on said actuating lever, and a curved slot provided in said casing and slidably receiving said pin therein so that said movable body is slightly transversely movable relative to said casing.

8. A tape recorder of the magazine type according to claim 6, in which said means comprises a pin provided on said casing and a curved slot provided in said actuating lever and slidably receiving said pin therein so that said movable body is slightly transversely movable relative to said casing.

9. A tape recorder of the magazine type according to claim 1, comprising link means vertically movably supporting said movable body within said casing, and an actuating lever secured at one end thereof to said movable body for causing the vertical movement of said movable body, said actuating lever having the other or actuating end thereof projecting outwardly through a portion of said casing which has a surface contour which conforms substantially, to the locus drawn by said actuating end of said actuating lever during its movement.

10. A tape recorder of the magazine type according to claim 1, comprising link means for vertically movably supporting said movable body within said casing, a first lever for changing the tape speed operatively connected to the internal mechanism of said movable body, and a second lever for actuating said first lever, said second lever being engageable with said first lever when said movable body is urged upwardly toward its upper position within said casing.

11. A tape recorder of the magazine type according to claim 1, comprising link means for vertically movably supporting said movable body within said casing, a first lever for changing the tape speed operatively connected to the internal mechanism of said movable body, and a second lever for actuating said first lever, said second lever being adapted to normally engage said first lever irrespective of any vertical position of said movable body.

12. A tape recorder of the magazine type according to claim 11, in which said second lever has an arcuate portion of the shape which conforms to the locus drawn by the engaging portion of said first lever with said second lever during the vertical movement of said movable body so that said first lever and said second lever can always engage each other.

References Cited

UNITED STATES PATENTS

| | | | |
|---|---|---|---|
| 3,385,534 | 5/1968 | Staar | 242—198 |
| 3,395,871 | 8/1968 | Ackerman et al. | 242—198 |
| 3,408,017 | 10/1968 | Hashimoto | 242—200 |
| 3,417,938 | 12/1968 | Markakis et al. | 242—200 |
| 3,429,519 | 2/1969 | Staar | 242—200 |

LEONARD D. CHRISTIAN, Primary Examiner

U.S. Cl. X.R.

274—11